June 11, 1946.  G. A. CROWTHER  2,402,027

CAM MECHANISM

Filed Feb. 1, 1941  2 Sheets—Sheet 2

INVENTOR
George A. Crowther
Victor D. Borst
ATTORNEY

Patented June 11, 1946

2,402,027

UNITED STATES PATENT OFFICE 2,402,027

CAM MECHANISM

George A. Crowther, Manhasset, N. Y., assignor to Ford Instrument Company, Inc., Long Island City, N. Y., a corporation of New York Application February 1, 1941, Serial No. 377,004

6 Claims. (Cl. 74—1)

This invention relates to cam mechanisms and particularly to that type of cam mechanism which has an output related to each of two variable inputs. Such mechanisms are known generally as three-dimensional cams.

In constructing machines to perform mechanical calculations it often is necessary to determine a factor or produce a motion of a member in accordance with the function of two variables. The relation between the factor or the resultant motion and the variables is usually expressed graphically on charts by a family of variably spaced curves in which the ordinates of each curve are the values of the factors and the abscissae are the values of one variable for a specific value of the second variable. The various spaces between the curves in the family of curves represent the effect of equal increments in the value of the second variable.

Heretofore such factors have been determined by the so-called three-dimensional cams, that is, solids have been shaped such that their lateral cross-sections have been of such form that the distances from the rotating axis of the solid to points on the surface of the lateral cross-sections for the various rotational positions of the solid, refine the relations between the factor and one variable for a definite value of the second variable. The said relations for various values of the second variable are obtained by shaping the consecutive lateral cross-sections of the solid along its rotational axis in accordance with the relation of the factor and the one variable for the consecutive values of the second variable.

The solid three-dimensional cam of the prior art is expensive to make because of the long and accurate mechining and finishing required, and the cam and its associated follower mechanism require considerable space, which is so often at a premium in calculating and computing instruments.

The principal object of the invention is to eliminate the disadvantages inherent in the solid three-dimensional cam by providing a cam mechanism having an output variably responsive to each of two variable inputs and that is flat, occupies a relatively small space and requires a relatively short time to machine and assemble.

Figure 1:
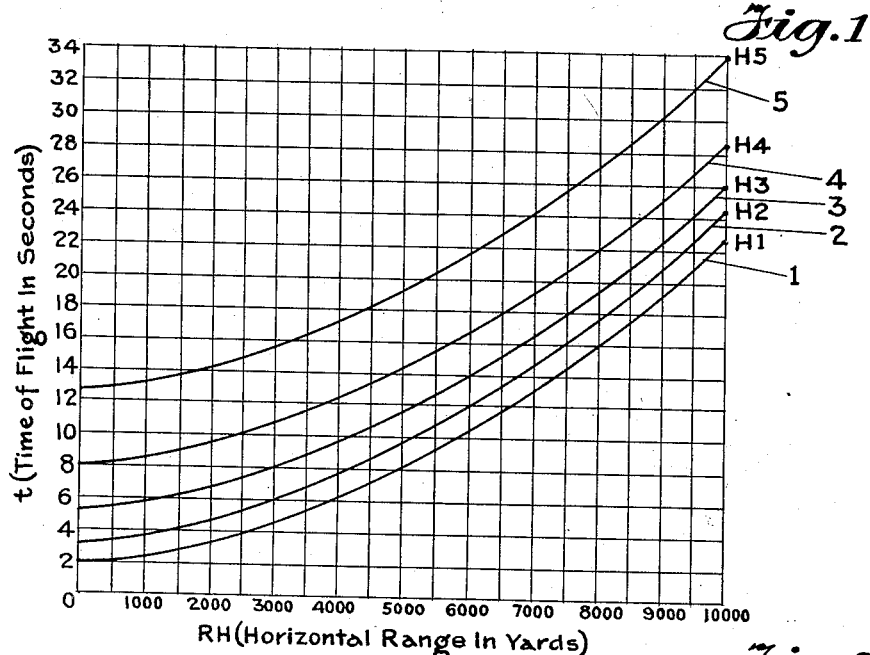
Figure 2:
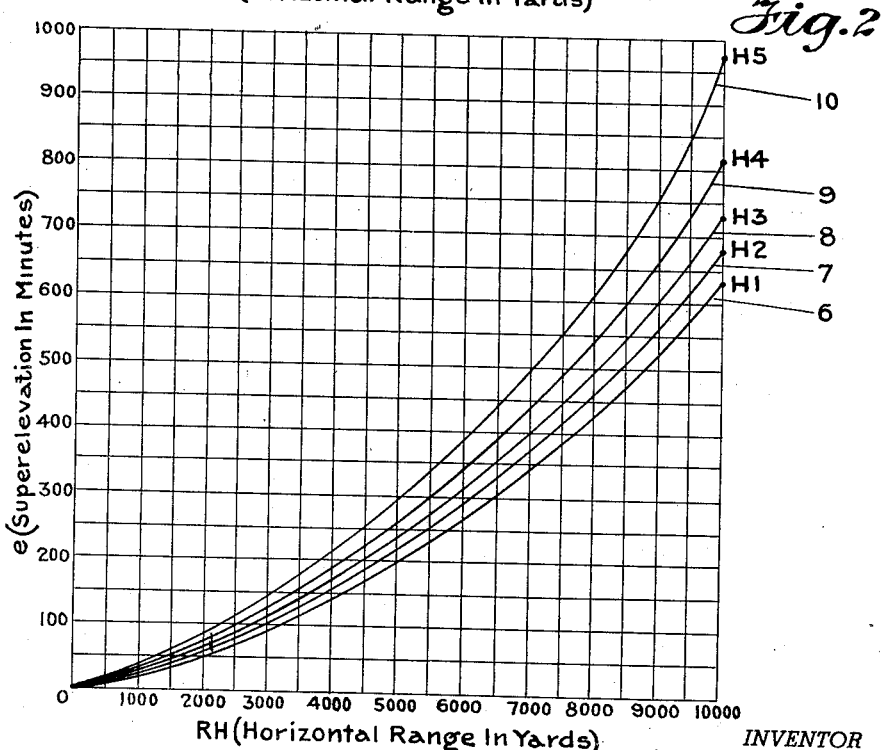
Figure 3:
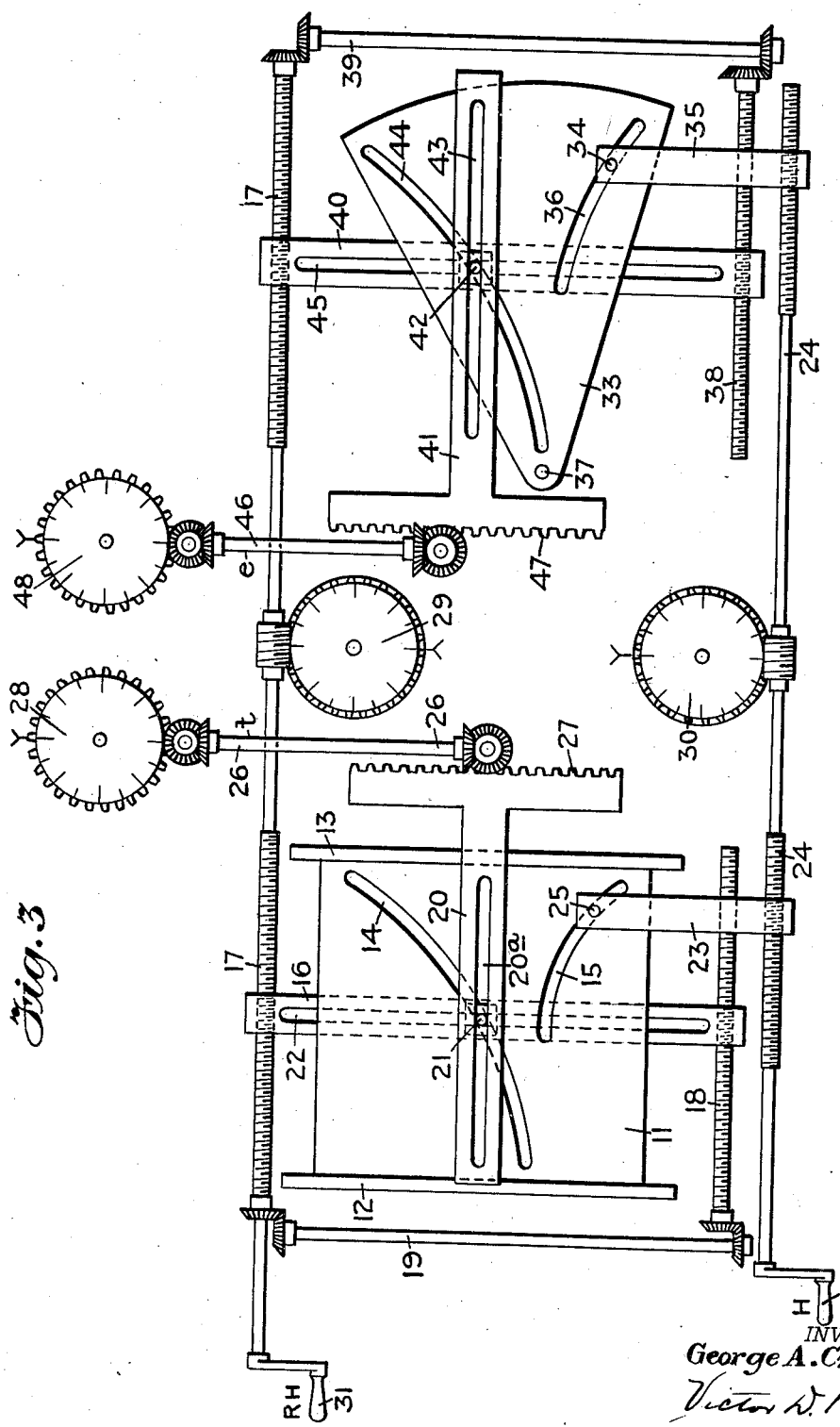

Other objects will be apparent from a consideration of the specification and the drawings in which:

Fig. 1 is a chart in the form of a family of translated curves showing the relation between a factor and its two determining variables;

Fig. 2 is a chart similar to that of Fig. 1, except that the curves in the family of curves are angularly displaced from each other in accordance with the second variable; and Fig. 3 is a plan view of two embodiments of the invention, the left half showing an arrangement in which the cam member is moved vertically in accordance with the second variable and the right half of the figure showing an arrangement in which the cam member is rotated in accordance with the second variable.

Referring to Fig. 1, lines 1, 2, 3, 4 and 5 represent curves defining the relation between the time of flight ($t$) of a projectile and the horizontal range (RH) of a target for values of height (H) of the target H1, H2, H3, H4 and H5, respectively.

Referring to Fig. 2, lines 6, 7, 8, 9 and 10 represent curves defining the relation between the super elevation of a gun above the line of sight ($e$) and the horizontal range (RH) of a target for values of height (H) of the target of H1, H2, H3, H4 and H5 respectively.

Referring to Fig. 3, the mechanisms selected to show two embodiments of the invention are grouped into a single mechanism to illustrate how two units may be combined to produce two movements corresponding to two families of curves when the two families of curves are based on the same two variables. It is of course obvious that each unit may be used separately, if desired.

In Fig. 3, a cam plate 11 is constrained by guides 12 and 13 to move vertically. Two grooves 14 and 15, the surfaces of which form cam surfaces, are cut in plate 11. Just below the plate 11 is positioned a first movable input slide 16 which receives its motion by a threaded portion of shaft 17 engaging threads in a lateral hole at the upper end of slide 16 and by threaded shaft 18, geared to shaft 17 by shaft 19, engaging a threaded lateral hole in the lower end of slide 16. It is of course obvious that slide 16 could be moved by shaft 17 alone if properly guided and the arrangement shown including shaft 18 merely assures positive translational movements of slide 16 for movements of shaft 17.

Directly above plate 11 is positioned output slide 20 which is constrained to move vertically by suitable guides (not shown). The vertical movement of output slide 20 is accomplished by connecting slide 20, plate 11 and slide 16 together by a pin 21 which passes through slot 20a in slide 20, groove 14 in plate 11 and slot 22 in slide 16 with a snug, sliding fit.

The second variable is set into the cam by slide 23 which is moved horizontally by threaded shaft 24 engaging threads in a lateral hole in the lower end of slide 23. At the upper end of slide 23 is mounted a pin 25 which engages the surfaces of cam groove 15.

It will therefore be seen that the vertical movement of slide 20 is dependent upon the horizontal position of slide 16 and the vertical position of plate 11, as positioned by pin 25 moving in groove 15.

The relative vertical position of slide 20 is made visually available by gearing shaft 26 to rack 27 of slide 20 and gearing shaft 26 to a conventional graduated dial 28.

The set in values of slide 16 and slide 23 are made visually available by conventional graduated dials 29 and 30, geared respectively to shafts 17 and 24. Shafts 17 and 24 are turned by handles 31 and 32, respectively.

A second form of a cam mechanism of this invention is shown in the right half of Fig. 3, which is similar to the cam mechanism described except that plate 33 which corresponds to plate 11 is angularly moved about pivot pin 37 by pin 34 in slide 35 engaging the surfaces of cam groove 36, cut in plate 33. The pivot pin 37 is mounted on the frame of the unit (not shown). Shaft 17 and shaft 38 geared to shaft 17 by shaft 39 move slide 40 in a manner similar to that of slide 16. Output slide 41 which corresponds to slide 20 receives a vertical movement in suitable slides (not shown) by its being connected to plate 33 and slide 40 by pin 42, which moves in slot 43 of slide 41, groove 44 in plate 33 and slot 45 of slide 40.

The vertical movement of slide 41 is made visually available by gearing shaft 46 to rack 47 on slide 41 and gearing it also to a conventional graduated dial 48.

As an example of applying the embodiments of the invention to the families of curves in Figs. 1 and 2, crank 31, shafts 17, 19, 18, 39 and 38, slides 16 and 40, and dial 29, are moved in accordance with variable RH; handle 32, shaft 24, slides 23 and 35, and dial 30, are moved in accordance with the variable H; and slides 20 and 41 are moved in accordance with the values of (t) and (e) respectively.

The output values represented by rotation of shafts 26 and 46 may be mechanically introduced as input factors of associated mechanisms instead of or in addition to being indicated by the dials 28 and 48.

It is obvious that various changes may be made by those skilled in the art in the details of the embodiment of the invention disclosed in the drawings and described above within the principle and scope of the invention as expressed in the appended claims.

I claim:

1. A cam mechanism comprising a member having two cam surfaces thereon, means for mounting the member for restrained movement, a first input slide, means for moving the first slide in accordance with a first input value, a second input slide, means for moving the second input slide in accordance with a second input value, a follower on the second input slide adapted to engage one of said cam surfaces, an output slide adapted to restricted movement and means engaging the first input slide and the second cam surface and the output slide whereby the output slide is moved to positions in accordance with functions of the first and the second input values.

2. A cam mechanism comprising a member having two cam surfaces thereon, means for mounting the member for restrained movement, a first input slide having a slot therein, means for moving the first slide in accordance with a first input value, a second input slide, means for moving the second input slide in accordance with a second input value, a follower on the second input slide adapted to engage one of said cam surfaces, an output slide having a slot therein and adapted to restricted movement, means engaging the surfaces of the slots in the first input slide and the output slide and the second cam surface whereby the output slide is moved in accordance with functions of the first and the second input values, and means connected to the output slide for indicating the position thereof.

3. A cam mechanism comprising a member having two groove cam surfaces therein, means for mounting the member for restrained vertical movement, a first input slide having a slot therein, means for moving the first input slide horizontally in accordance with a first input value, a second input slide, means for moving the second input slide horizontally in accordance with a second input value, a pin on the second input slide adapted to engage one of said cam surfaces for moving the member vertically, an output slide having a slot therein and adapted to restrained vertical movement, and a pin passing through the slot of the first input slide and engaging the other of the said cam surfaces and passing through the slot of the output slide, whereby the output slide is moved vertically in accordance with functions of the first and the second input values.

4. A cam mechanism comprising a member having two groove cam surfaces therein, means for mounting the member for restrained angular movement, a first input slide having a slot therein, means for moving the first input slide horizontally in accordance with a first input value, a second input slide, means for moving the second input slide horizontally in accordance with a second input value, a pin on the second input slide adapted to engage one of the said cam surfaces for moving the member angularly, an output slide having a slot therein and mounted for vertical movement, and a pin passing through the slot of the first input slide and engaging the other of the said cam surfaces and passing through the slot of the output slide, whereby the output slide is moved vertically in accordance with functions of the first and the second input values.

5. A cam mechanism comprising a member having two groove cam surfaces therein, means for mounting the member for restrained vertical movement, a first input slide having a slot therein, means for moving the first input silde horizontally in accordance with a first input value, a second input slide, means for moving the second input slide horizontally in accordance with a second input value, a pin on the second input slide in sliding engagement with one of said cam surfaces for moving the member vertically, an output slide having a slot therein and mounted for vertical movement, and a pin passing through the slot of the first input slide and engaging the other of the said cam surfaces and passing through the slot of the output slide whereby the output slide is moved vertically to positions in accordance with functions of the first and the second input values, and means connected to the output slide for indicating the position thereof.

6. A cam mechanism comprising a member having two groove cam surfaces therein, means for mounting the member for restrained angular movement, a first input slide having a slot therein, means for moving the first input slide horizontally in accordance with a first input value, a second input slide, means for moving the second input slide horizontally in accordance with a second input value, a pin on the second input slide adapted to engage one of said cam surfaces for moving the member angularly, an output slide having a slot therein and mounted for vertical movement, and a pin passing through the slot of the first input slide and engaging the other of the said cam surfaces and passing through the slot of the output slide, whereby the output slide is moved vertically in accordance with functions of the first and the second input values and means connected to the output slide for indicating the position thereof.

GEORGE A. CROWTHER.